Sept. 23, 1930.   L. ONORATO   1,776,393
TAILOR'S SQUARE
Filed Feb. 1, 1928   2 Sheets-Sheet 1
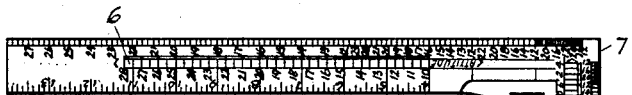
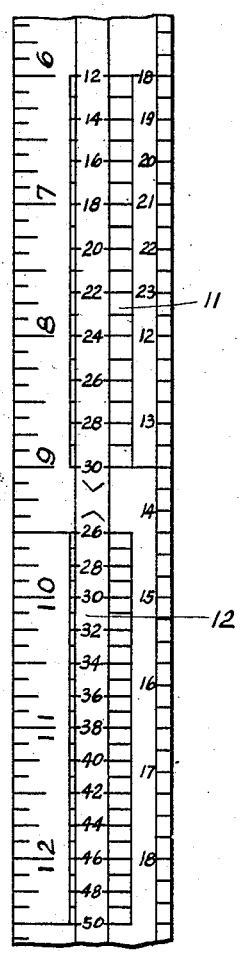
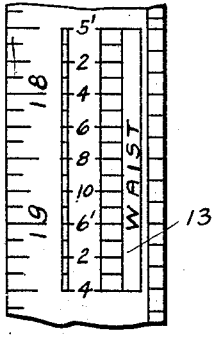
WITNESSES:   INVENTOR:
Luigi Onorato,
BY
ATTORNEY.

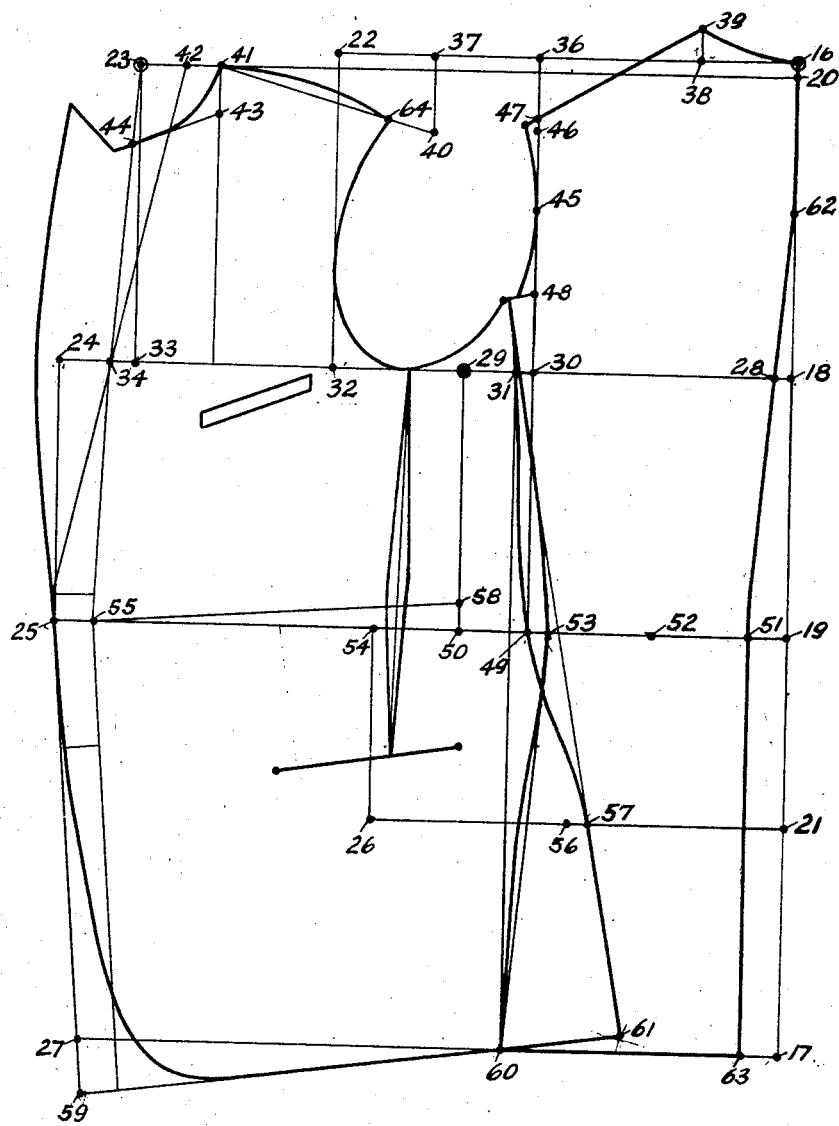

Patented Sept. 23, 1930

1,776,393

UNITED STATES PATENT OFFICE

LUIGI ONORATO, OF PHILADELPHIA, PENNSYLVANIA

TAILOR'S SQUARE

Application filed February 1, 1928. Serial No. 250,973.

My invention relates to instruments for drafting or laying out garments and more particularly to certain improvements in tailors' squares.

The object of the invention is to provide a tailor's square which carries certain scales and reference marks, in addition to those customarily imprinted thereon, so that fewer measurements and fewer calculations are required in order to draft a garment.

In order that an understanding of my invention may be had, it will be described in connection with the drafting of a man's coat but it may also be used for drafting other garments and its advantages and uses will be readily apparent from the following description when read in conjunction with the accompanying drawings, in which Figure 1 is a view of one side of my improved square showing the relative location of the several scales and marks, Figures 2, 3 and 4 are enlarged views of those portions of the scale to which my new scales have been added.

Figure 5 is a schematic drawing, showing the method of drafting a coat by the use of the square shown in Figure 1.

The height of a man may be divided into eight equal parts and that portion of his anatomy falling into any one of the eight subdivisions will always be in proportion to those portions falling within the other subdivisions. Certain proportions are always relative to the breast measurement and other proportions are relative to the breast measurement and height. Thus, one coat will fit all normal men of the same height and breast measurement, however, all men are not normally erect so that the "attitude" of the man must be considered. Briefly, the invention consists in providing a square having certain scales and marks in addition to the scales ordinarily found on a tailor's square so that it is only necessary to make a few measurements of the man in order to draft a garment for him.

Referring first to Figures 1 to 4, the scale 6 on the short arm of the square is graduated in fifths of an inch, the graduations numbered according to half-breast sizes and the scale designated "Attitude"; the scale being readable from the outer edge 7 of the square. The long arm of the square carries a scale 8 marked "Height", reference lines 9 and 10, marked "Back" and "Front", respectively; a scale 11 marked "Balance", a scale 12 marked "Scye", and a scale 13 marked "Waist". Scales 8 and 13 are graduated in eighths of an inch and the graduations numbered to represent feet and inches in height; scale 11 graduated in sixths of an inch and the graduations numbered to represent both half-breast sizes and half-waist sizes, and scale 12 graduated in eighths of an inch and the graduations numbered to represent breast sizes.

Certain measurements, which were heretofore calculated or obtained by measuring the person for whom the garment is to be made, may be obtained directly from my improved square. The distance from the graduation representing a person's height on scale 8 to the corresponding mark on scale 13 is equal to his waist length and from the same graduation on scale 8 to the graduation on scale 12 representing his breast measurement is equal to the scye depth required. The distance between reference lines 9 and 10 is equal to the difference in height between the highest working point at the rear and the highest working point at the front of the garment. The distance from the graduation on scale 6 representing one-half of the breast size to the edge of the square is equal to the distance from the back seam to the back of the scye when measured along the line of the bottom of the scye. The distances from lines 9 and 10 to graduations on scale 11 representing one-half of the breast measurement and one-half of the waist measurement are equal to certain other measurements, as will be hereinafter described, which affect the fit or "balance" of the garment. In order that an understanding of the use of my improved square may be had, the laying out of a garment for an individual of a certain size will be given.

Referring now to Figure 5 and assuming that a coat or coat pattern is to be drafted for a man 5′ 8″ tall and having a breast measurement of 38″, a waist measurement of 34", and a seat measurement of 40"; the square is laid on the goods or pattern paper and the line 16—17 drawn. Without moving the square, a mark is made at the graduation representing the height (5' 8") on scale 8, which locates point 16, the highest working point on the back of the garment; a mark made at the graduation representing the breast measurement (38") on scale 12, which locates point 18 or depth of the scye; a mark made at the graduation representing the height (5' 8") on scale 13, which locates point 19 or waistline, and point 17 is located a sufficient distance from point 16 to provide a coat of the length desired. A point 20 is located on line 16—17 a distance from point 16 equal to the distance between reference lines 9 and 10 on the square and a point 21 located on line 16—17, 6" below point 19. Lines are drawn from these points at right angles to line 16—17 to form lines 16—22, 20—23, 18—24, 19—25, 21—26, and 17—27.

On line 18—24, a point 28 is laid off one-half inch from point 18. If the man is normally erect, a point 29 is laid off from point 28 a distance equal to one-fourth of the breast measurement or 9½". If he is not normally erect, point 29 must be located a distance from point 28 equal to the actual measurement obtained by measuring the man. In other words, the location of point 29 is determined by the "attitude" of the man. Edge 7 is now placed on point 28 and a mark made at the graduation on scale 6 representing the half-breast measurement (19"), which locates point 30, and a point 31 is located ½" beyond point 30. A point 32 is located a distance from point 28 equal to two-thirds of the actual half-breast measurement plus 1¼" and a point 33 located a distance from point 28 equal to one-half of the full breast measurement plus 1½". Points 34 and 24 are located ¾" and 2¼", respectively, from point 33.

Point 23, which is the highest working point at the front of the garment, is located at the intersecton of line 20—23 with a line drawn at right angles to line 18—24 at point 33. Point 22 is located at the intersection of a line drawn at right angles to line 18—24 at point 32 and line 16—22.

By squaring up from point 30, a point 36 is located on line 16—22 and a point 37 is located midway between points 22 and 36. Point 38 is located by placing the long arm of the square along line 16—22 with reference line 9 on point 16 and marking line 16—22 opposite the graduation on scale 11 representing one-half the breast measurement (19"). Point 39 is located by squaring up from point 38 a distance of one inch and point 40 located by squaring down from point 37 a distance of 2¼".

Point 41 is located by placing the square along line 20—23 with reference line 10 on point 23 and marking line 20—23 opposite the graduation on scale 11 representing one-half the breast measurement (19") and point 42 is 1¼" from point 41. Point 43 is located by squaring down from point 41 a distance equal to one-eighth the breast measurement less one-half inch. Point 44 is located on a line drawn through points 23 and 34 a distance from point 23 equal to one-sixth of the breast measurement plus one-half inch.

On line 30—36, a point 45 is located midway between points 30 and 36, a point 46 midway between points 36 and 45, a point 47 a half-inch from point 46, and a point 48 a distance from point 30 equal to one-twelfth of the breast measurement plus one-half inch.

The square is now placed on line 18—24 and points 49 and 50 located on line 19—25 by squaring down from points 30 and 29 respectively. Point 51 is located a distance from point 50 equal to one-quarter of the full waist measurement plus one-quarter inch and point 52 is located a distance from point 51 equal to one-sixth of the breast measurement. Point 53 is located by placing reference mark 9 on point 52 and marking line 19—25 opposite the graduation on scale 11 representing one-half the waist measurement (17"). Point 54 is located by placing reference line 10 on point 50 and marking line 19—25 opposite the graduation on scale 11 representing one-half of the breast measurement (19"). Point 55 is located from point 54 a distance equal to one-quarter of the full waist measurement and point 25 is 1¼" from point 55.

Point 26 is located by placing one arm of the square on line 19—25 and squaring down from the point 54. Point 56 is located on line 21—26 a distance from point 26 equal to one-third of the seat measurement and point 57 is ¾" from point 56.

A point 58 is located on line 29—50 one inch above point 50 and a line drawn through points 58 and 55. The short arm of the square is placed on line 55—58 and lines drawn at right angles thereto from points 55 and 25; the intersection of the line drawn from point 25 and line 17—27 locating point 27 and a point 59 is located on this line below point 27 a distance equal to one-eighth of the breast measurement.

By squaring down from line 18—24 at point 31, point 60 is located on line 17—22 and a line drawn through points 59 and 60 will intersect a line drawn through points 31 and 57 and locate point 61.

A line drawn from point 16 to a point 62 located midway between points 16 and 18, through points 28 and 51, and then drawn parallel to line 16—17 to a point 63 on line 17—27 will shape the rear edge of the coat pattern. Now by connecting the several points with lines as shown, locating a point 64 on line 40—41 a distance from point 41 one-fourth inch less than the distance between points 39 and 47, and shaping the garment as shown, a pattern is completed for a coat which will accurately fit the person for whom it is designed.

In addition to the scales and marks described, my improved square carries the usual scales, such as sixths, thirds, quarters, etc., so that a fractional part of any measurement may be marked directly from the square in the customary manner. By combining my new scales with those ordinarily employed, a garment may be drafted without resorting to calculations for determining the locations of critical points, thus reducing the possibility of costly errors as well as conserving a portion of the workman's time.

While I have shown a preferred embodiment of my invention and described one of its uses, it will be apparent that other forms may be employed and the instrument adapted to other uses without departing from the spirit of the invention, hence, I do not wish to limit myself to the precise construction shown but consider that I am at liberty to make such changes and applications as fairly come within the scope of the appended claims.

I claim:—

1. A measuring device for tailors having a plurality of scales thereon, one of which is graduated and marked to represent height, one of which is graduated to represent height and marked to represent waist length, and one graduated to represent breast sizes and marked to represent scye depth; the scales being so spaced from one another that the distance between graduations representing a person's height on the height and waist length scales will be equal to his waist length and the distance between the graduation representing his height on the height scale and the graduation representing his breast size on the scye-depth scale will equal his scye depth.

2. A measuring device for tailors having thereon a pair of reference lines, which are spaced from each other a distance equal to the vertical distance between the highest working point on the back of a garment and the highest working point on the front thereof, and a plurality of scales, one of which is graduated to represent both half-breast and half-waist sizes and so spaced from the reference lines that the distance from the graduation representing the half-breast size of a garment to one of the lines is equal to the horizontal distance between the highest working point at the front of the garment and the point on the front part of the garment representing the collar end of the shoulder seam and the distance from the graduation representing the half-waist measure of the garment to the other reference line plus one-sixth of the breast measurement of the garment is equal to the width of the back piece of the garment at the waist-line.

3. A tailor's measuring instrument provided with a pair of scales having graduations designating the height of an individual, the graduations on one scale corresponding to those on the other and being similarly designated, said scales being so related on the instrument that the distance between similar height designations on the two scales will equal his waist length.

4. A tailor's measuring instrument comprising a member having a pair of scales each graduated with height designations thereon, the graduations of one scale being similarly designated to those of the other, the position of the various similarly designated graduations relative to each other being such that the distance between similarly designated graduations on the two scales, designating the height of a person, will equal a certain other dimension of his body.

5. A measuring instrument having a plurality of scales thereon, each scale divided to correspond to the divisions of other scales and being so related that the distances between a division on one scale and corresponding divisions on other scales will equal relative dimensions of a person's body whose height corresponds to the particular divisions selected.

In testimony whereof I have signed my name to this specification.

LUIGI ONORATO.